US006211515B1

(12) United States Patent
Chen et al.

(10) Patent No.: US 6,211,515 B1
(45) Date of Patent: Apr. 3, 2001

(54) ADAPTIVE NON-UNIFORMITY COMPENSATION USING FEEDFORWARD SHUNTING AND WAVELET FILTER

(75) Inventors: Hai-Wen Chen, Tucson, AZ (US); Dennis C. Braunreiter, San Diego, CA (US); Harry A. Schmitt, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/175,223

(22) Filed: Oct. 19, 1998

(51) Int. Cl.[7] .................................................. G06K 9/03
(52) U.S. Cl. ........................................ 250/252.1; 250/332
(58) Field of Search .................................. 250/252.1, 332

(56) References Cited

U.S. PATENT DOCUMENTS 5,903,659 * 5/1999 Kilgore ............................... 250/332

* cited by examiner

Primary Examiner—Constantine Hannaher
Assistant Examiner—Andrew Israel

(74) Attorney, Agent, or Firm—David W. Collins; Glenn H. Lenzen, Jr.

(57) ABSTRACT

A system and method adapted for use with a focal plane array of electromagnetic energy detectors to receive first and second frames of image data from electromagnetic energy received from at least a portion of a scene. The first frame is a focused frame and the second frame is a blurred frame. In a feed-forward path the system compares the first frame to the second frame and provides an error signal in response thereto. In a main path, the system multiplies at least a portion of the second frame of image data with the error signal to provide a noise error corrected output signal. In the preferred embodiment, a wavelet filter is used to remove dome shading effects from the frames of image data. In the best mode, the wavelet filter is disposed in the main path and blurred and focused outputs therefrom are weighted, averaged and stored. Coefficients from the weighted, averaged and stored focused frames are compared to coefficients from the weighted, averaged and stored blurred frames to provide a fixed pattern noise error signal. A temporal noise error signal is identified from the weighted, averaged and stored focused frames. The fixed pattern noise error signal and the temporal noise error signals are sparse processed and shunted from a current frame. Thereafter, a constant mean value may be added to provide the output signal. Pixel replacement can be consolidated into a single circuit and positioned prior to the wavelet filter.

30 Claims, 6 Drawing Sheets

FIG. 5
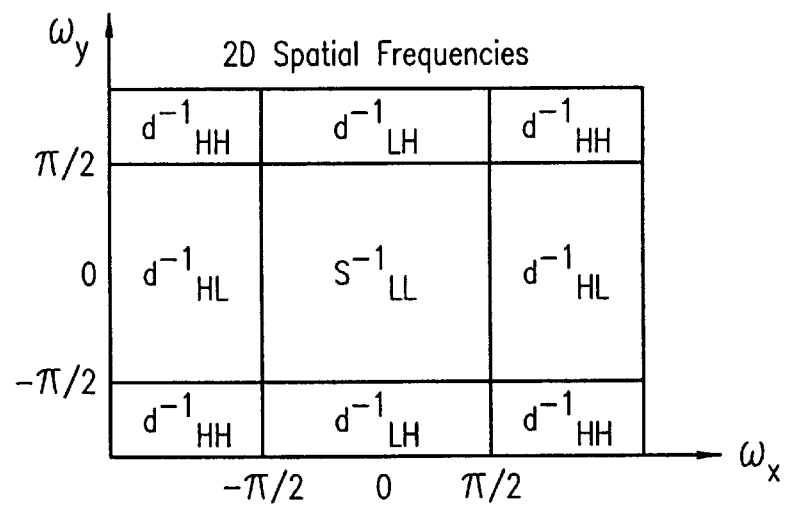
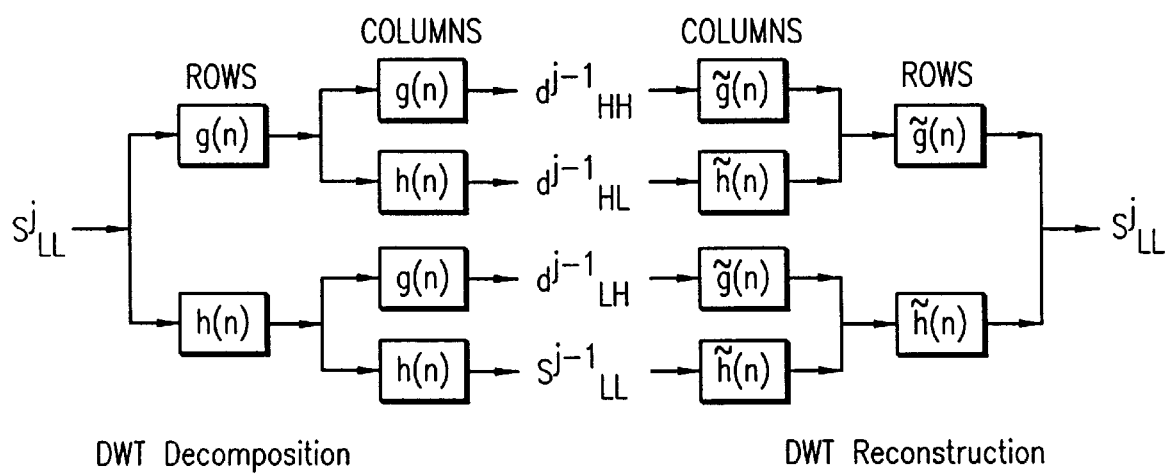
DWT Decomposition    DWT Reconstruction
FIG. 6

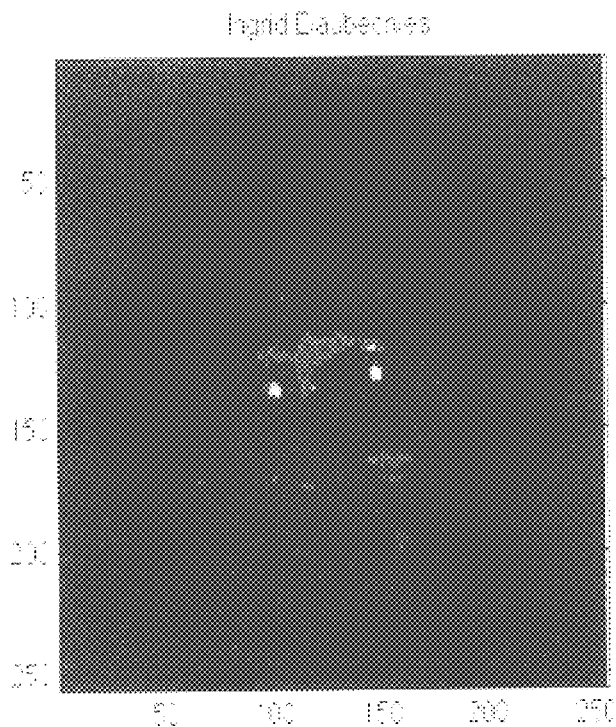
FIG. 7a
FIG. 7b
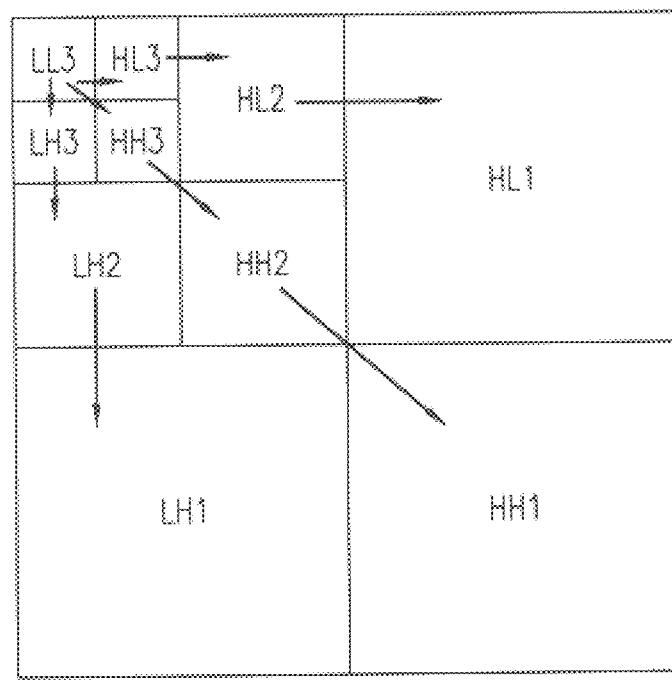

ADAPTIVE NON-UNIFORMITY COMPENSATION USING FEEDFORWARD SHUNTING AND WAVELET FILTER

BACKGROUND OF THE INVENTION

1. Field of the Invention

The present invention relates to image and data processing systems and techniques. More specifically, the present invention relates to systems and techniques for adaptive non-uniformity compensation for focal plane arrays of infrared detectors and the like.

2. Description of the Related Art

Focal plane arrays are used in military, astronomical and other applications. For example, in military applications, focal plane arrays are often used for target acquisition and tracking. The seekers of missiles often use arrays of image detectors sensitive to energy in the visible or (more typically) infrared portion of the electromagnetic spectrum. Unfortunately, these arrays, referred to as focal plane arrays are subject to anomalies such as detector to detector non-uniformity in sensitivity, gain/offset and fixed pattern noise. While numerous techniques are known in the art for addressing detector to detector nonuniformity in sensitivity and gain/offset, fixed pattern noise continues to be problematic.

Fixed pattern noise (FPNs) are sensor fixed artifacts induced by non-uniform response of the focal plane array (FPA). The non-uniform response causes the FPA output to be spatially varying even when illuminated by a uniform source. Techniques such as stored non-uniformity correction can correct for the non-uniform array response under static conditions. But dynamic inputs, such as changing photon flux induced by dome heating, requires dynamic or adaptive non-uniformity compensation.

Accordingly, nonuniformity compensation (NUC) systems have been developed to address detector to detector nonuniformities. In particular, adaptive nonuniformity compensation systems (ADNUC) have been developed to address fixed pattern noise in focal plane arrays of image detectors. Traditional ADNUC systems use an additive feedback algorithm wherein a correction-offset term is accumulated from an error-term which is generated from the filtered output image. The correction term is then subtracted from the next input image. Therefore, depending on the feedback coefficients (the non-linear transfer functions), it takes about 10–30 image frames for the ADNUC systems to reduce the FPN from an initial high value to a low equilibrium value. While nominally effective, this system limits the response time of the system.

In addition, conventional ADNUC systems are not designed to remove temporally correlated temporal noise. Further, because FPNs are fixed on the focal plane and hence are temporally correlated, they present a more difficult false alarm problem than that presented by temporally uncorrelated temporal noise (TN). In traditional ADNUC systems, the accumulated correction-offset terms will cause fixed-pattern artifacts, which may lead to a high number of false alarms for target detection by the missile tracking system (i.e., the "tracker").

Further, traditional systems do not remove hot-dome shading effects. Hot dome shading is a heating of the missile dome due to aerodynamic friction effects. The heat on the dome creates a thermal background image which causes a filter mismatch in the tracker and thereby limits the performance of the system.

Hence, a need remains in the art for a system and technique for addressing fixed pattern noise in focal plane arrays. Specifically, there is a need for a system and technique for rapidly addressing fixed pattern noise, including temporal noise and dome shading, in focal plane arrays of infrared image detectors.

SUMMARY OF THE INVENTION

The need in the art is addressed by the adaptive nonuniformity compensation system and method of the present invention. The inventive system is adapted for use with a focal plane array of electromagnetic energy detectors and is adapted to receive first and second interleaved frames of image data from electromagnetic energy received from at least a portion of a scene within a field of view of the detectors. The first frame is a focused frame and the second frame is a blurred frame. In a feed-forward path the inventive system compares the first frame to the second frame and provides an error signal in response thereto. In a main path, the system multiplies (or divides) at least a portion of the second frame of image data with the error signal to provide an noise error corrected output signal.

In the preferred embodiment, a wavelet filter is provided to remove dome shading effects from the frames of image data. In the best mode, the wavelet filter is disposed in the main path and blurred and focused outputs therefrom are weighted, averaged and stored. The weighted, averaged and stored focused frames are compared to the weighted, averaged and stored blurred frames to provide a fixed pattern noise error signal. A temporal noise error signal is identified from the weighted, averaged and stored focused frames. The fixed pattern noise error signal and the temporal noise error signals are sparse processed and shunted from a current frame using multiplication or division. Thereafter, a constant mean value may be added to provide the output signal. Pixel replacement can be consolidated into a single circuit and positioned prior to the wavelet filter.

The invention provides a feedforward shunting system and technique which reduces fixed pattern noise on a frame by frame basis without accumulation of error terms from prior frames. The system uses the focused and blurred frame pairs and wavelet filters to find spatial nonuniform regions in the image. For those pixels identified to be fixed pattern noise, the pixel value derived from the focal plane array is shunted (divided by a large number, typically 8 to 64). For non-fixed pattern noise pixels, the focal plane array output is unmodified. This shunting process leads to faster adaptation and results in reduced residual FPN and artifact generation.

Hence, the invention provides a system and technique for rapidly addressing fixed pattern noise, including temporal noise and dome shading, in focal plane arrays of infrared image detectors.

BRIEF DESCRIPTION OF THE DRAWINGS

FIG. 5 is a diagram which illustrates wavelet processing as utilized in the adaptive nonuniformity correction circuit of the present invention.

FIG. 6 illustrates discrete wavelet transform decomposition and reconstruction.

FIG. 7a shows the original image of Ms. Daubechies.

FIG. 7b illustrates a DWT transform of the image of FIG. 7a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figures 1, 3:
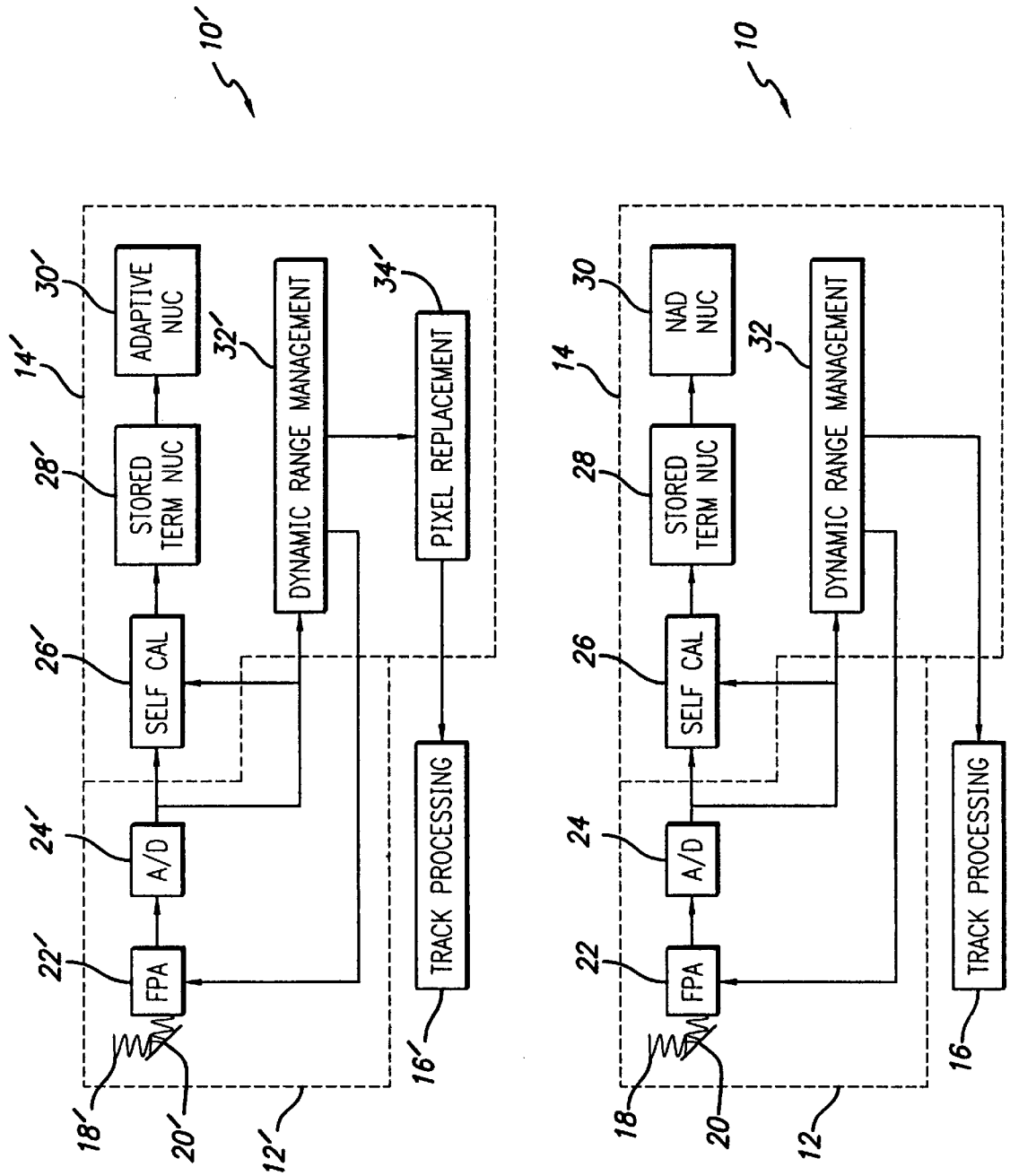
FIG. 1 is a block diagram of an infrared video processing system constructed in accordance with conventional teachings.
FIG. 3 is a block diagram of an infrared video processing system constructed in accordance with the teachings of the present invention.

FIG. 1 is a block diagram of an infrared video processing system constructed in accordance with conventional teachings. The system 10' is implemented in hardware and software and includes an infrared camera 12'. The output of the video camera is processed by a video processing system 14' and a tracker 16'. Within the camera 12', infrared energy 18' from a scene is reflected by a deformable mirror 20' to a focal plane array (FPA) 22'. The output of the FPA 22' is digitized by an analog-to-digital (A/D) converter 24' and input to a self-calibration circuit 26'. The self-calibration circuit 26' is typically implemented with a digital signal processor. The output of the self-calibration circuit 26' is input to a stored term processing circuit 28'. The stored term nonuniformity compensation (NUC) circuit 28' eliminates nonuniformities in the focal plane array that are detected at the time of manufacture at two different temperatures. Accordingly, the stored term NUC circuit 28' is often referred to as a '2-point NUC'. The output of the 2-point NUC 28' is input to an adaptive nonuniformity compensation circuit (ADNUC) 30'. The conventional ADNUC 30' is described more fully below. The output of the ADNUC 30' is input to a dynamic range management circuit (DRM) 32'. Dead and defective pixels in the output image are replaced by a pixel replacement circuit 34' before the output signal is input to the tracker 16' for processing. Typically, the ADNUC is implemented with an application specific integrated circuit (ASIC) and the video processor 14' is implemented on a single chip.

The deformable mirror can provide blurred video frames between focused frames of video. The purpose of the blurring function is to uniformly spread the energy within the scene over the seeker field of view. These frames should then only exhibit nonuniformities due to the FPA 22'. As discussed more fully below, from the blurred frames, the ADNUC 30' develops offset correction terms to be applied in subsequent focused frames.

The FPA 22' may be an EDI-128/ST readout with InSb detectors. The function of the FPA is to convert the irradiance pattern at the detector array into an analog voltage waveform replicating the image. The output voltage of the FPA for the (i,j) pixel, with i representing column number and j representing row number, can be written in terms of the flux density at the pixel and the integration time:

$$V0_{ij} = Q_{ij} G0_{ij} t + O0_{ij} \qquad [1]$$

where $V0_{ij}$ is the FPA output voltage for the pixel, $Q_{ij}$ is the flux density at the detector element, $G0_{ij}$ is the responsivity of the pixel, t is the integration time, $O0_{ij}$ is the offset of the pixel, and the subscript "ij" refers to the (i,j) pixel. The integration time, t, is determined by DRM computation in the central processing unit (CPU) and is communicated to the FPA electronics through the off-gimbal electronics (OGE).

The A/D circuit 24' digitizes the raw output of the FPA 22'. The A/D also outputs an additional video line (e.g., row 129) that contains reference information utilized by the self-calibration circuit 26' and the dynamic range management circuit 32'. This additional data is stripped from the video immediately after the A/D converter 24'.

The video processing begins with the self-calibration circuit 26' which uses the FPA reference data (row 129) to compensate for analog drifts in the FPA 22', the A/D 24' and the bias circuitry therefor. The stored term NUC corrects the gross static nonuniformities of the FPA. While, the ADNUC compensates for the residual and dynamic changes of the nonuniformity. The dynamic range management circuit 32' maintains the FPA at maximum sensitivity by adjusting integration time and detector bias and maps the 16-bit output into a 14-bit output. Dynamic defective element and saturated pixel identification and replacement are also provided as a final step prior to passing the video to the first element of the track processing, the tracker spatial filter.

Figure 2:
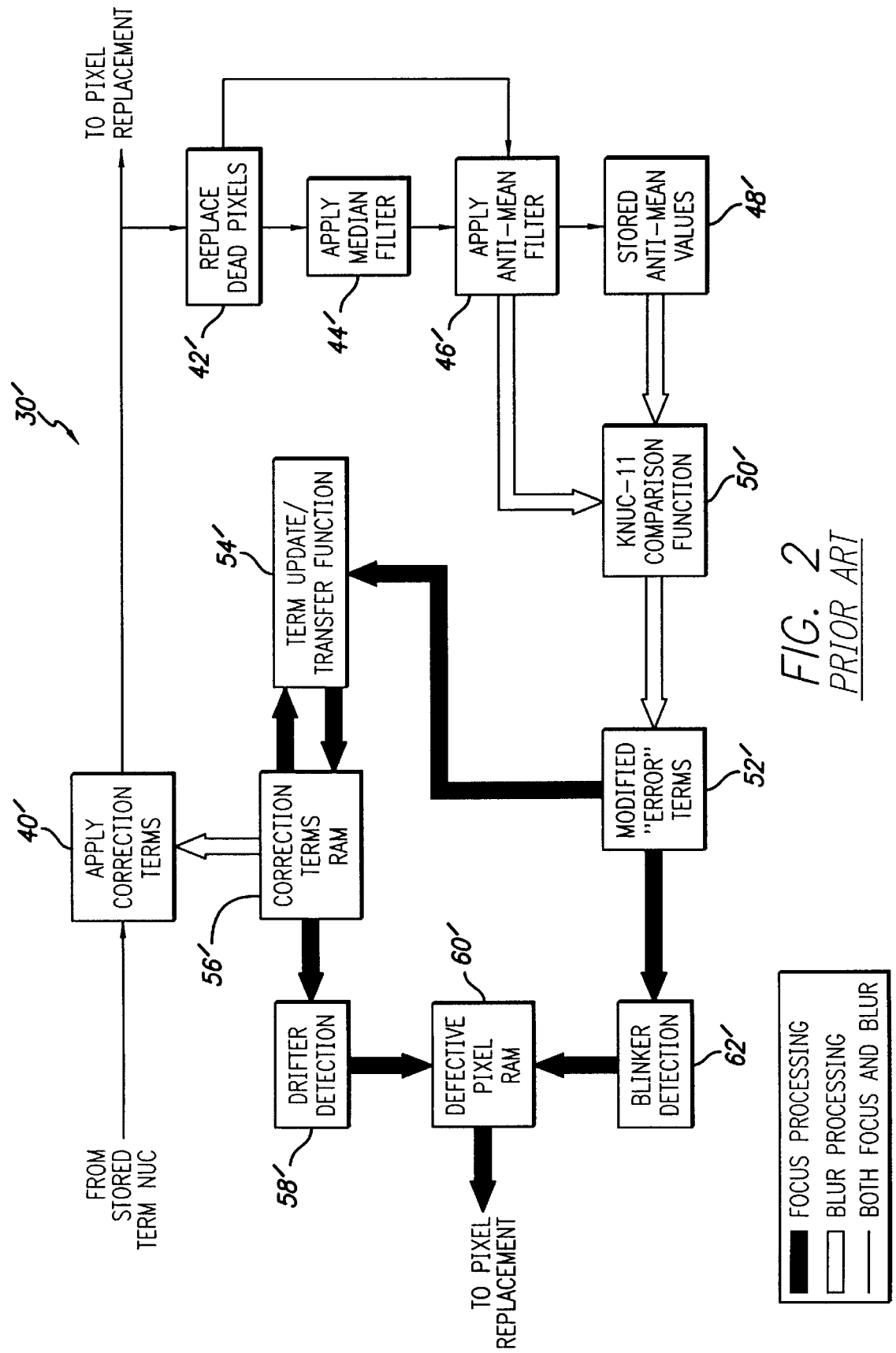
FIG. 2 shows an anti-mean filter in the feedback path as is typical of conventional teachings.

FIG. 2 is a block diagram of the ADNUC constructed in accordance with conventional teachings and implemented in the system depicted in FIG. 1. As is well known in the art, the conventional ADNUC 30' uses an additive feedback algorithm to adaptively suppress fixed pattern noise (FPN). Alternate images are blurred and focused by the optical system as discussed above. An estimate of the FPN is stored in a correction term random access memory (RAM) 56'. On each focus frame, the value in the correction term RAM 56' is subtracted from the FPA output to produce a corrected image. On each frame pair (one focus and one blur frame), pixels which have values that are deviant from its neighbors are detected by the anti-mean filter. For very small objects coming through the optical system, their amplitude is suppressed by the blurring operation. Thus, these pixels will have large anti-mean output differences between the focus and blurred frames. On the other hand, FPNs are unaffected by the optical system and hence produce the similar anti-mean outputs in both the blur and focus frames. The KNUC-II Comparison circuit 50' compares the outputs from the focus and blur frames to detect FPNs. For identified FPN occupied pixels, a fraction of the anti-mean output from the focus (or blurred) frame is accumulated in the Correction Term RAM 56' to estimate the FPN.

The Term Update/Transfer Function block 54' determines the fraction (feedback coefficient) of the error signal to be accumulated on each frame. It chooses the fraction to maintain a balance among the rate of correction, temporal noise (TN) reduction, and artifact minimization. Depending on the feedback coefficients used, it takes about 10–30 frames for the ADNUC to drive the FPN to steady state value. This method works well under static FPN conditions. However, the FPN changes dynamically during missile flight. The relatively long time required to reach steady state leads to an increase in the steady state value of the residual FPN. In addition, subtraction of the accumulated correction term from the focus frame leads to image artifacts when the scene is changed rapidly. The increased residual FPN and artifacts can create false alarms and tracker breaklocks. These and other problems are addressed by the adaptive nonuniformity compensation system and method of the present invention.

The inventive system is adapted for use with a focal plane array of electromagnetic energy detectors and is adapted to receive first and second frames of image data from electromagnetic energy received from at least a portion of a scene within a field of view of the detectors. The first frame is a focused frame and the second frame is an unfocused frame. In a feed-forward path the inventive system compares the first frame to the second frame and provides an error signal in response thereto. In a main path, the system multiplies (or divides) at least a portion of the second frame of image data with the error signal to provide an noise error corrected output signal.

In the preferred embodiment, a wavelet filter is used to remove dome shading effects from the frames of image data. In the best mode, the wavelet filter is disposed in the main path and blurred and focused outputs therefrom are weighted, averaged and stored. The weighted, averaged and stored focused frames are compared to the weighted, averaged and stored blurred frames to provide a fixed pattern noise error signal. A temporal noise error signal is identified from the weighted, averaged and stored focused frames. The fixed pattern and temporal noise error signals are sparse processed, fed forward and shunted from a current frame using multiplication or division. Thereafter, a constant mean value may be added to provide the output signal. Pixel replacement can be consolidated into a single circuit and positioned prior to the wavelet filter.

The invention provides a feedforward shunting system and technique which reduces fixed pattern noise on a frame by frame basis without accumulation of error terms from prior frames. The system uses the focused and blurred frame pairs and wavelet filters to find spatial nonuniform regions in the image. For those pixels identified to be fixed pattern noise, the pixel value derived from the focal plane array is shunted (divided by a large number, typically 8 to 64). For non-fixed pattern noise pixels, the focal plane array output is unmodified. This shunting process leads to faster adaptation and results in reduced residual FPN and artifact generation.

Hence, the invention provides a system and technique for rapidly addressing fixed pattern noise, including temporal noise and dome shading, in focal plane arrays of infrared image detectors.

FIG. 3 is a block diagram of an infrared video processing system constructed in accordance with the teachings of the present invention. The inventive system 10 is similar to the system 10' of FIG. 1 with the exception that the pixel replacement circuit 34' of FIG. 1 is consolidated into a pixel replacement circuit in a nontraditional adaptive nonuniformity correction (NADNUC) circuit 30 constructed in accordance with the present teachings.

Recent research in human and monkey visual systems have shown that shunting (multiplicative/divisive) feedback and feedforward mechanisms provide faster adaptation than traditional additive/subtractive feedback mechanism (See "Modeling and Identification of Parallel Non-linear Systems: Structural Classification and Parameter Estimation Methods," by Hai-Wen Chen, *Proceedings of the IEEE*, vol. 83, pp. 39–66, 1995; "Non-linear Neural Networks: Principles, Mechanisms, and Architectures," by S. Grossberg, *Neural Networks*, vol. 1, pp. 17–61, 1988; "Model for Visual Luminance Discrimination and Flicker Detection," by G. Sperling and M. M. Sondhi, *Journal of Opt. Soc. Am.*, vol. 58, pp. 1133–1145, 1968; and "Summation and Division by Neurons in Primate Visual Cortex," by M. Carandini and D. Heeger, *Science*, vol. 264, pp. 1333–1336, 1994.)

The NADNUC 30 of the present invention uses a feedforward shunting methodology to reduce FPNs on a frame by frame basis without accumulation of error terms from prior frames. As in the traditional ADNUC 30', the NADNUC 30 uses the focused and blurred frame pairs and wavelet filters to find spatial nonuniform regions in the image. A NADNUC comparison block performs the equivalent FPN detection function performed by the KNUC Comparison block. For those pixels identified to be FPN, the pixel value derived from the FPA is shunted (divided by a large number, typically 8 to 64). For non-FPN pixels, the FPA output is unmodified. This shunting process leads to faster adaptation and results in reduced residual FPN and artifact generation.

Figure 4:
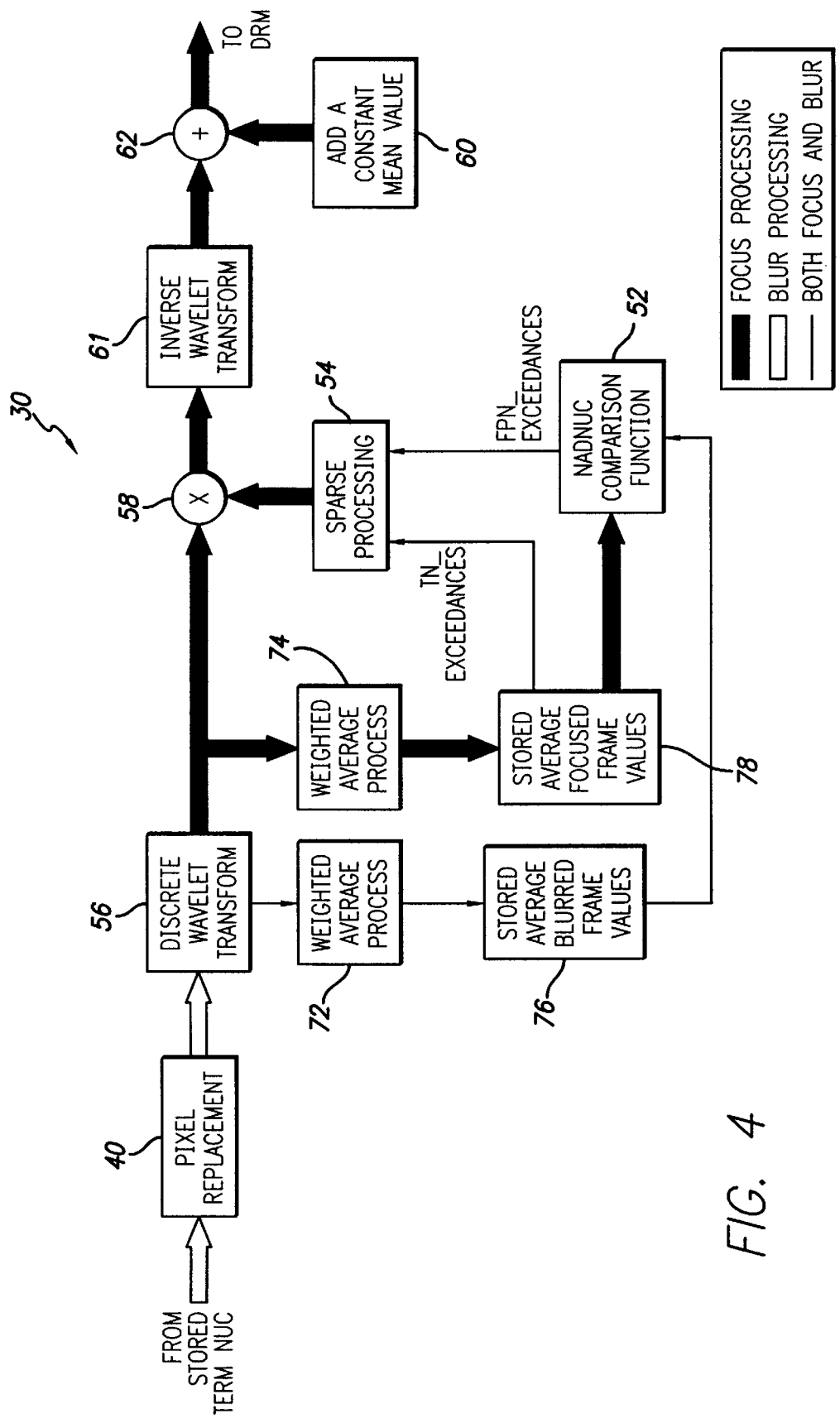
FIG. 4 shows an illustrative embodiment of the nontraditional adaptive nonuniformity correction circuit constructed in accordance with the teachings of the present invention.

FIG. 4 shows an illustrative embodiment of the nontraditional adaptive nonuniformity correction circuit constructed in accordance with the teachings of the present invention. As in the traditional ADNUC, the basic NADNUC uses the focused and blurred frame pairs and wavelet filters to find spatial nonuniform regions in the image. Blurred and focused frames from the stored term NUC 28 are input to a pixel replacement circuit 42 which removes dead pixels from each frame. Next, as discussed more fully below, the blurred and focused frames are filtered with wavelet filter 56 to remove the effects of dome shading and reduce the image noise.

Based on the original work by Meyer (1993), Daubechies (1992), Mallat (1989), and others, wavelet processing/analysis has recently become a powerful tool for many engineering applications such as image/signal compression, fast matrix calculations, image/signal enhancement and de-noising, pattern recognition, image edge-detection/feature-extraction, and etc. (See "A Theory for Multiresolution Signal Decomposition: The Wavelet Representation," by S. Mallat, *IEEE Trans., Pattern Anal. Mach. Intel.*, Vol. 11, pp. 674–693, 1989; *Ten Lectures on Wavelets*, by I. Daubechies, SIAM, Philadelphia, 1992; and Wavelet: *Algorithms and Application*, by Y. Meyer, SIAM, Philadelphia, 1993.)

Many recent 2D (2-dimensional: x, y) image decomposition and reconstruction studies for engineering applications are based on the *Fast Pyramidal Algorithm* (or DWT) originally developed by Mallat (1989). Mallat used symmetric orthogonal cubic splines for the low-pass and high-pass QMF [*quadrature mirror filter pair* (h(n), g(n))]. Many other (non-orthogonal, bi-orthogonal, asymmetric) QMF pairs have also been developed (such as the ortho-normal wavelets of Daubechies, Coiflet, Symmlet, B-spline filters, as well as FIR and IIR filters, etc.). More recently, Mallat's 2D separable *Fast Pyramidal Algorithm* has been extended for spatio-temporal 3D multi-resolution wavelet filter banks.

The discrete wavelet transform (DWT) algorithm decomposes an original image to 4 sub-sampled sub-images with a lower (½) resolution: the smooth (texture) sub-image (containing the low spatial frequency (SF) information of the original image by convolving twice (for rows and columns of the image) using the low-pass filter h(n))); the detail on-diagonal sub-image (containing the high SF edge information of the original image (by convolving twice using the high-pass filter g(n))); and the detail vertical and horizontal subimages (by convolving both the low-pass h(n) and the high-pass g(n) filters).

Hence, for the ortho-normal wavelet:

$$\tilde{h}(n)=h(-n), \tilde{g}(n)=g(-n) \quad [2]$$

and for the bi-orthogonal wavelet:

$$\tilde{g}(n)=(-1)^n h(1-n), \quad [3]$$

and $$g(n)=(-1)^n \tilde{h}(1-n). \quad [4]$$

Each sub-image contains one fourth of the information of the original image, and they are orthogonal to each other.

FIG. 5 is a diagram which illustrates 2D spatial frequencies of each subimages after DWT as utilized in the adaptive nonuniformity compensation circuit of the present invention. FIG. 6 illustrates discrete wavelet transform decomposition and reconstruction. As shown in FIG. 5, the smooth sub-image (LL) contains the low spatial frequency (SF) information of the original image, while the detail subimages (HH, HL, and LH) contain the high SF on-diagonal, vertical, and horizontal edge information of the original image, and the SF bands of the subimages are orthogonal to each other. The obtained smooth sub-image (LL) can be further reduced to the next lower resolution by applying the fast algorithm recursively. Therefore, the DWT process can be considered as a generalized case of the two-channel process. Instead only decomposing the original image into high SF and low SF channels (the 2-channel process), the DWT can decompose the original image into multiple orthogonal channels (the multiple sub-bands/subimages). For example, for a one level DWT decomposition, we obtain 4 channels: LL1, HH1, HL1, and LH1. For a two level DWT decomposition, the LL1 can be further decomposed into 4 subimages: LL2, HH2, HL2, and LH2.

Figure 7C:
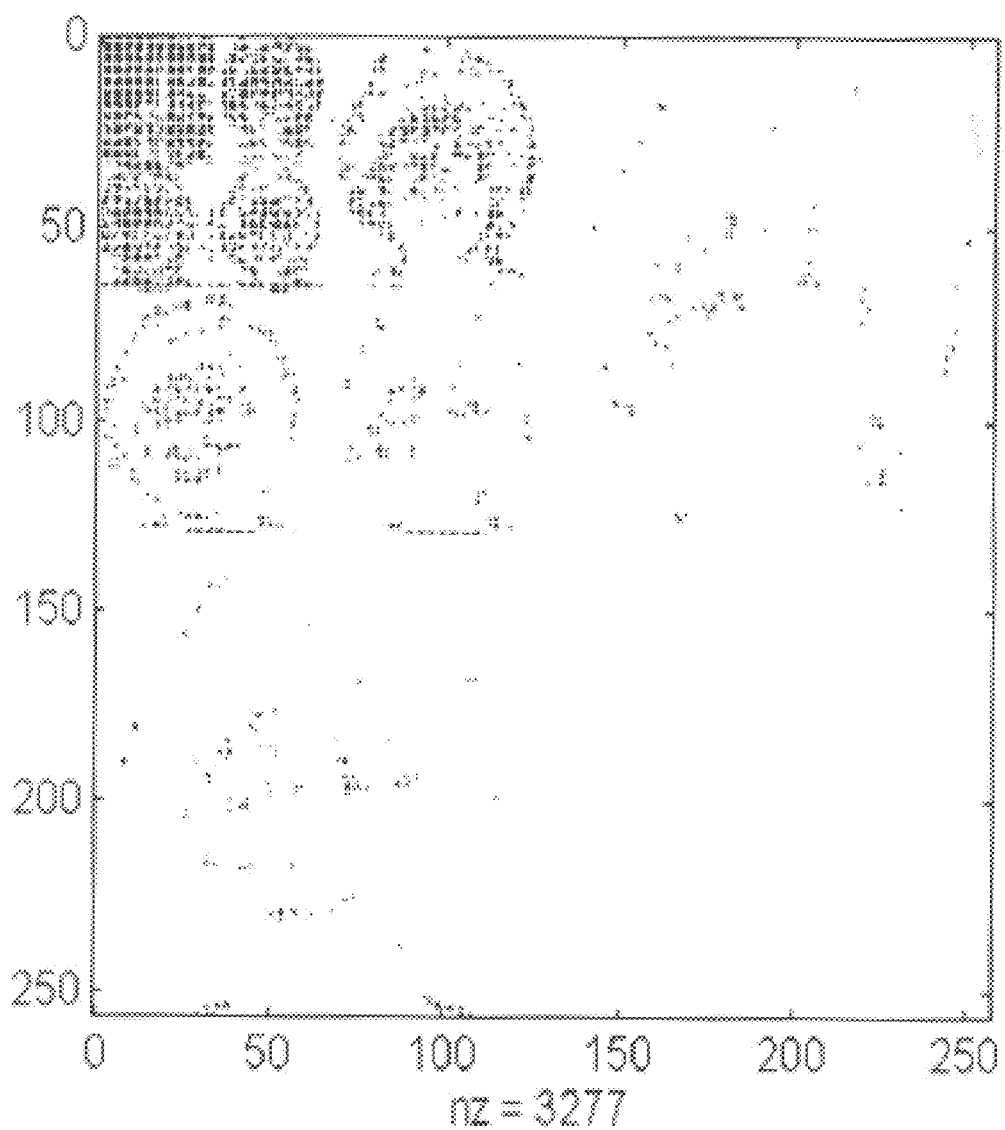
FIG. 7c shows the subimages of the image decomposed by the DWT transform depicted in FIG. 7b.

FIGS. 7a–c depict a three level DWT decomposition of Daubechies's image. FIG. 7a shows the original image of Ms. Daubechies. FIG. 7b illustrates a DWT transform of the image of FIG. 7a. FIG. 7c shows the subimages of the image decomposed by the DWT transform depicted in FIG. 7b.

The DWT 56 can decompose the original image into subimages with different resolutions (multiresolution) and orthogonal spatial frequency (SF) sub-bands. The hot-dome shading can be removed by removing the sub-image with the lowest SF which contains mostly the low SF hot-dome shading.

The traditional ADNUC system 30' uses only the high spatial frequency (SF) channel to process the non-uniformity compensation. Only the signals which can pass through the anti-mean filter (the high SF channel) in the feedback pathway can get compensated by the ADNUC circuit 30'. For a 3×3 or a 5×5 anti-mean filter size, some low spatial frequency (SF) noise and the dome shading can not pass through the filter, and exactly the same as the anti-mean filter used in the ADNUC chip, the uncompensated low SF noise and dome shading will again be filtered out, and the tracker only sees the compensated video signals. However, if the spatial filter in the tracker is different (in size or type) from the one in the ADNUC, some of the uncompensated low SF noise and dome shading will pass through the filter and cause higher FPN.

In the non-traditional adaptive nonuniformity compensation (NADNUC) system 30 of the present invention, the input image is divided into a high SF component and a low SF component by using a wavelet filter. The high SF component is then processed by applying the feedforward shunting (multiplicative) algorithm. The resulting component is then supplemented by a constant mean value.

The provision of a wavelet filter in the main path allows for the elimination of the effects of dome shading in the NADNUC circuit 30 and is one of several significant features of the present invention. This is illustrated by FIG. 2 which shows an anti-mean filter 46' in the feedback path as is typical of conventional teachings. This is due to the need to provide a noise signal with zero mean suitable for comparison. Hence, the ADNUC circuits of the prior art do not remove dome shading and leave the distortion caused thereby to the tracker for handling. This complicates the design and limits the performance of the tracker 16 as will be appreciated by those skilled in the art.

The multiplication of the FPN occupied pixels with a small number (or the equivalent division of the FPN pixels by a large number) reduces or "shunts" the effects of these pixels on the current frame. That is, for those pixels identified to be FPN, the pixel value derived from the FPA is shunted (divided by a large number, typically 8 to 64). For non-FPN pixels, the FPA output is unmodified. As a result of the shunting process, the amplitude of FPN occupied pixels are driven toward zero. This shunting process leads to faster adaptation and results in reduced residual FPN and artifact generation.

Returning to FIG. 4, circuits 72 and 74 provide a weighted average of a predetermined number of frames output by the DWT 56. Blurred averaged frames are stored in a first memory 76 and focused averaged frames are stored in a second memory 78.

A NADNUC comparator 52 performs the equivalent FPN detection function performed by the KNUC comparison circuit 50' of FIG. 2. The output of the NADNUC comparator 52 is fixed pattern noise (FPN). If the NADNUC threshold is set equal to the KNUC-II threshold, the NADNUC system 30 will have the same target detectability as the traditional ADNUC 30'. The lower the threshold, the weaker the intensity of a target can be detected. However, in this case, more noise will pass through the system without being shunted. To solve this problem, the averaged NADNUC system 30 of FIG. 4 is designed so that instead of comparing a single focused frame with a single blurred frame, the NADNUC comparison function compares the averaged focused frame with averaged blurred frame which is an accumulation of all the previous frames with the highest weighting for the most recent frame. The averaged frame has lower temporal noise (the average effect). Therefore, for the same obtained FPN level, the system 30 of FIG. 4 can set a lower threshold, and thus can pass weaker targets (i.e., higher target detectability) than the system 30'.

The average process offers different choices depending on desire to weigh the previous frames versus the current one. The following recursive algorithm may be used to test for the weighted average:

$$Fca=(Fc+Fpa)/2 \quad [5]$$

where, Fca is the current averaged frame, Fc the current frame, and Fpa the previous averaged frame. Equation [5] shows that the current frame has the highest weighting and a previous frame gets less and less weighting with the time going on (a decay rate of $2^i$, where i is the frame number).

A more general case of equation [5] is $$Fca=(Fc+Fpa*r)/(1+r) \quad [6]$$

where r is the weighting factor related to the decay rate of the previous frames. It is seen that equation [5] is a special case of equation [6] when r=1. In general, a smaller r leads to a higher weighting for the current frame. When r=0 (i.e., no average), we obtain the basic NADNUC system where only the current focused and blurred frame pair is used for the NADNUC comparison function. A higher current frame weighting would be more suitable for nonstationary cases (such as moving targets), but would be less effective in reducing temporal noise. The parameter r can be set to be adjustable depending on the applications. The regular (equally weighted) average process can be implemented by $$Fca = [Fc + Fpa*(i-1)]/i \quad [7]$$

where i (=1, 2, 3, . . . ) is the increasing frame number.

The difference of the absolute image pixel values in the averaged focused and blurred frame pair is compared with the NADNUC threshold.

The output of the NADNUC comparison circuit 52 is input to a sparse processing circuit 54. A second input to the sparse processing circuit 54 is provided by the second memory 78. The stored averaged focused wavelet coefficients are thresholded with a thresholding circuit 80 (not shown). The output of the thresholding circuit is input to the sparse processing circuit 54. The averaged focused frame can be used to set a TN threshold for reducing TN. The averaged values for pixels containing FPN and target will be high, while the averaged values for pixels containing mostly TN (zero-mean TN after the wavelet filter) will be close to zero. Furthermore, since the output of the shunting process is very sensitive to the threshold level, both FPN and TN thresholds can be adaptively adjustable for maintaining a constant exceedance level (e.g., using an adjustable multiplying factor controlled adaptively by the tracker).

The averaged frames (focused and blurred) will have lower temporal noise (TN) than the single frames. Therefore, for a same NADNUC threshold, the NADNUC comparison function will allow more pixels in the input image to be shunted than would be shunted without averaging leading to lower single frame noise (SFN), FPN, and TN.

The sparse process further reduces the noise in the image. The sparse process (i.e., setting the wavelet coefficients below a threshold to zero and then inverse wavelet transform back to the image domain) can be considered as a special case of the shunting process (i.e., shunt the pixel value to zero instead of a small value).

FPN and TN values above the selected NADNUC threshold are shunted by the sparse processing circuit 54 and multiplied with corresponding pixels in a current frame by a multiplier 58 after the current frame is filtered by the wavelet filter 56 to remove the effects of dome shading in the main path.

The shunted outputs in the wavelet domain are then inverse wavelet transformed back to the image domain by an inverse wavelet transform circuit 61 to complete the reconstruction process. If additional track functions need to be performed in the wavelet domain, the inverse DWT filter can be implemented later in the tracker 16.

A constant mean value (e.g., an additive fixed constant typically 6000 to 7000 in a 14 bit image) from a memory 60 is added to the current frame pixels by a summer 62 to insure positive pixel values are input to the tracker 16. In this way, the low frequency nonuniformities are essentially suppressed and replaced with a DC term. The low frequency nonuniformities then become transparent to the signal processor independent of its spatial filter.

Thus, the present invention has been described herein with reference to a particular embodiment for a particular application. Besides rapid suppression of FPN, the advantages of the NADNUC are:

Removal of low spatial frequency fixed pattern noise induced by dome shading;

Reduced amplitude of residual fixed pattern noise, artifacts, and temporal noise;

Temporal decorrelation of artifacts;

Reduced distortion of spatially large targets due to anti-mean filtering.

Additional advantages accruing from the use of the wavelet filter include:

1) Fast throughput (compared with FFT and traditional convolution).

2) Further noise reduction by the sparse process and by removing some subimages which contain mostly the hot-dome shading and noise but not the targets and signals.

3) In the wavelet domain, many advanced tracker functions can be implemented very effectively: such as signal/image compression, noise removal, sensor fusion, fast linear algebra techniques, edge detection/ feature extraction, and automatic target recognition (ATR), etc.

Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An adaptive nonuniformity correction system for a focal plane array of electromagnetic energy detectors comprising:

first means for generating first and second frames of image data from electromagnetic energy received from at least a portion of a scene within a field of view of said detectors, said first frame being focused and said second frame being unfocused;

second means disposed at least partially in a feed-forward path for comparing said first frame to said second frame and providing an error signal in response thereto; and third means disposed in a main path for multiplying at least a portion of said second frame of image data with said error signal and providing an noise error corrected output signal.

2. The invention of claim 1 further including means disposed in said main path for removing dome shading effects.

3. The invention of claim 2 wherein said means disposed in said main path for removing dome shading effects is a wavelet filter.

4. The invention of claim 3 wherein said wavelet filter includes discrete wavelet transform means for providing a set of transform coefficients from said first and second frames of image data.

5. The invention of claim 4 further including means connected to the output of said discrete wavelet transform means for weighting said coefficients.

6. The invention of claim 4 further including means connected to the output of said discrete wavelet transform means for averaging said weighted coefficients corresponding to plural first frames of image data.

7. The invention of claim 6 further including means connected to the output of said discrete wavelet transform means for averaging a plurality of said weighted coefficients corresponding to plural second frames of image data.

8. The invention of claim 7 further including means for storing said weighted averaged coefficients corresponding to said first frames of image data.

9. The invention of claim 8 further including means for storing said weighted averaged coefficients corresponding to said second frames of image data.

10. The invention of claim 9 wherein said second means includes for comparing said stored weighted averaged coefficients corresponding to said first frames to said stored weighted averaged coefficients corresponding to said second frames and providing a fixed pattern noise error signal in response thereto.

11. The invention of claim 10 wherein said second means further includes means for identifying temporal noise in said stored weighted averaged coefficients corresponding to plural first frames of image data and providing a temporal noise error signal in response thereto.

12. The invention of claim 11 further including means for sparse processing said fixed pattern noise error signal and said temporal noise error signal and providing a combined error signal in response thereto.

13. The invention of claim 12 further including means for multiplying the output of said discrete wavelet transform means with said combined error signal.

14. The invention of claim 13 further including inverse wavelet transform means connected to the output of said means for multiplying for converting said coefficients into first and second frames of image data.

15. An infrared imaging system comprising:

a deformable mirror;

a focal plane array or infrared detectors adapted to provide alternating frames of image data;

first means for controlling said mirror to reflect alternating focused and blurred images from energy received from a scene to said focal plane array whereby said focal plane array outputs alternating first and second frames of image data corresponding to said focused and said blurred images respectively;

second means disposed in a feed-forward path for comparing said first frame to said second frame and providing an error signal in response thereto; and third means disposed in a main path for multiplying at least a portion of said second frame of image data with said error signal and providing an noise error corrected output signal.

16. The invention of claim 15 further including means disposed in said main path for removing dome shading effects.

17. The invention of claim 16 wherein said means disposed in said main path for removing dome shading effects is a wavelet filter.

18. The invention of claim 17 wherein said wavelet filter includes discrete wavelet transform means for providing a set of transform coefficients from said first and second frames of image data.

19. The invention of claim 18 further including means connected to the output of said discrete wavelet transform means for weighting said coefficients.

20. The invention of claim 19 further including means connected to the output of said discrete wavelet transform means for averaging said weighted coefficients corresponding to plural first frames of image data.

21. The invention of claim 20 further including means connected to the output of said discrete wavelet transform means for averaging a plurality of said weighted coefficients corresponding to plural second frames of image data.

22. The invention of claim 21 further including means for storing said weighted averaged coefficients corresponding to said first frames of image data.

23. The invention of claim 22 further including means for storing said weighted averaged coefficients corresponding to said second frames of image data.

24. The invention of claim 23 wherein said second means includes means for comparing said stored weighted averaged coefficients corresponding to said first frames to said stored weighted averaged coefficients corresponding to said second frames and providing a fixed pattern noise error signal in response thereto.

25. The invention of claim 24 wherein said second means further includes means for identifying temporal noise in said stored weighted averaged coefficients corresponding to plural first frames of image data and providing a temporal noise error signal in response thereto.

26. The invention of claim 25 further including means for sparse processing said fixed pattern noise error signal and said temporal noise error signal and providing a combined error signal in response thereto.

27. The invention of claim 26 further including means for multiplying the output of said discrete wavelet transform means with said combined error signal.

28. The invention of claim 27 further including inverse wavelet transform means connected to the output of said means for multiplying for converting said coefficients into first and second frames of image data.

29. An adaptive nonuniformity correction system for use with a focal plane array of electromagnetic energy detectors and means for generating first and second frames of image data from electromagnetic energy received from at least a portion of a scene within a field of view of said detectors, said first frame being focused and said second frame being unfocused, said correction system comprising:

first means disposed at least partially in a feed-forward path for comparing said first frame to said second frame and providing an error signal in response thereto; and second means disposed in a main path for multiplying at least a portion of said second frame of image data with said error signal and providing an noise error corrected output signal.

30. A method for adaptive nonuniformity correction for a focal plane array of electromagnetic energy detectors comprising the steps of:

generating first and second frames of image data from electromagnetic energy received from at least a portion of a scene within a field of view of said detectors, said first frame being focused and said second frame being unfocused;

comparing, at least partially in a feed-forward path, said first frame to said second frame and providing an error signal in response thereto; and multiplying, in a main path, at least a portion of said second frame of image data with said error signal and providing an noise error corrected output signal.

* * * * *